United States Patent [19]

Arvidsson

[11] Patent Number: 5,556,016
[45] Date of Patent: Sep. 17, 1996

[54] DEVICE FOR FASTENING A LOAD CARRIER

[75] Inventor: Jan-Ivar Arvidsson, Tranbärsstigen, Sweden

[73] Assignee: Industri Ab Thule, Hillerstorp, Sweden

[21] Appl. No.: 79,609

[22] Filed: Jun. 22, 1993

[30] Foreign Application Priority Data

Jun. 24, 1992 [SE] Sweden ................................. 9201935

[51] Int. Cl.⁶ ............................................. B60R 9/04
[52] U.S. Cl. ........................................ 224/329; 224/322
[58] Field of Search ................................. 224/329, 330, 224/331, 322, 325

[56] References Cited

U.S. PATENT DOCUMENTS

| | | |
|---|---|---|
| 3,253,755 | 5/1966 | Bott. |
| 4,877,168 | 10/1989 | Bott. |
| 4,911,348 | 3/1990 | Rasor et al. ............... 224/325 X |
| 5,282,562 | 2/1994 | Legault ....................... 224/329 |

FOREIGN PATENT DOCUMENTS

| | | |
|---|---|---|
| 2675095 | 10/1992 | France ........................ 224/329 |
| 2933718 | 3/1981 | Germany. |
| 3034226 | 4/1982 | Germany. |
| 3614747 | 11/1987 | Germany. |
| 2221664 | 2/1990 | United Kingdom ............. 224/329 |

OTHER PUBLICATIONS

Four-page European Search Report.

*Primary Examiner*—Renee S. Luebke
*Attorney, Agent, or Firm*—Novak Druce Reynolds Burt

[57] ABSTRACT

A device for fastening a load carrier (3) preferably a so-called roof railing, on a vehicle roof (1) comprises a hollow housing portion (5) which, with its one end, connects to the vehicle body and, with its other end, carries the load carrier (3). An adapter (4) is secured on the vehicle roof (1) and has, on its upper side, an abutment (6) which is accommodated by the opening portion of the housing portion (5). The adapter (4) has a catch (7) in which engages a loop of wire (8) which is anchored in a nut (10) interiorly in the housing portion (5). A screw (9) engages in the nut (10) and, with its head (16), abuts against a support surface (17) at the end of the housing portion (15) facing towards the load carrier (3). The head (16) of the screw is accessible for tightening via an opening in the wall of the load carrier (3) whereby the loop (8) is drawn up into the housing portion (5) and this securely to the adapter (4).

17 Claims, 1 Drawing Sheet

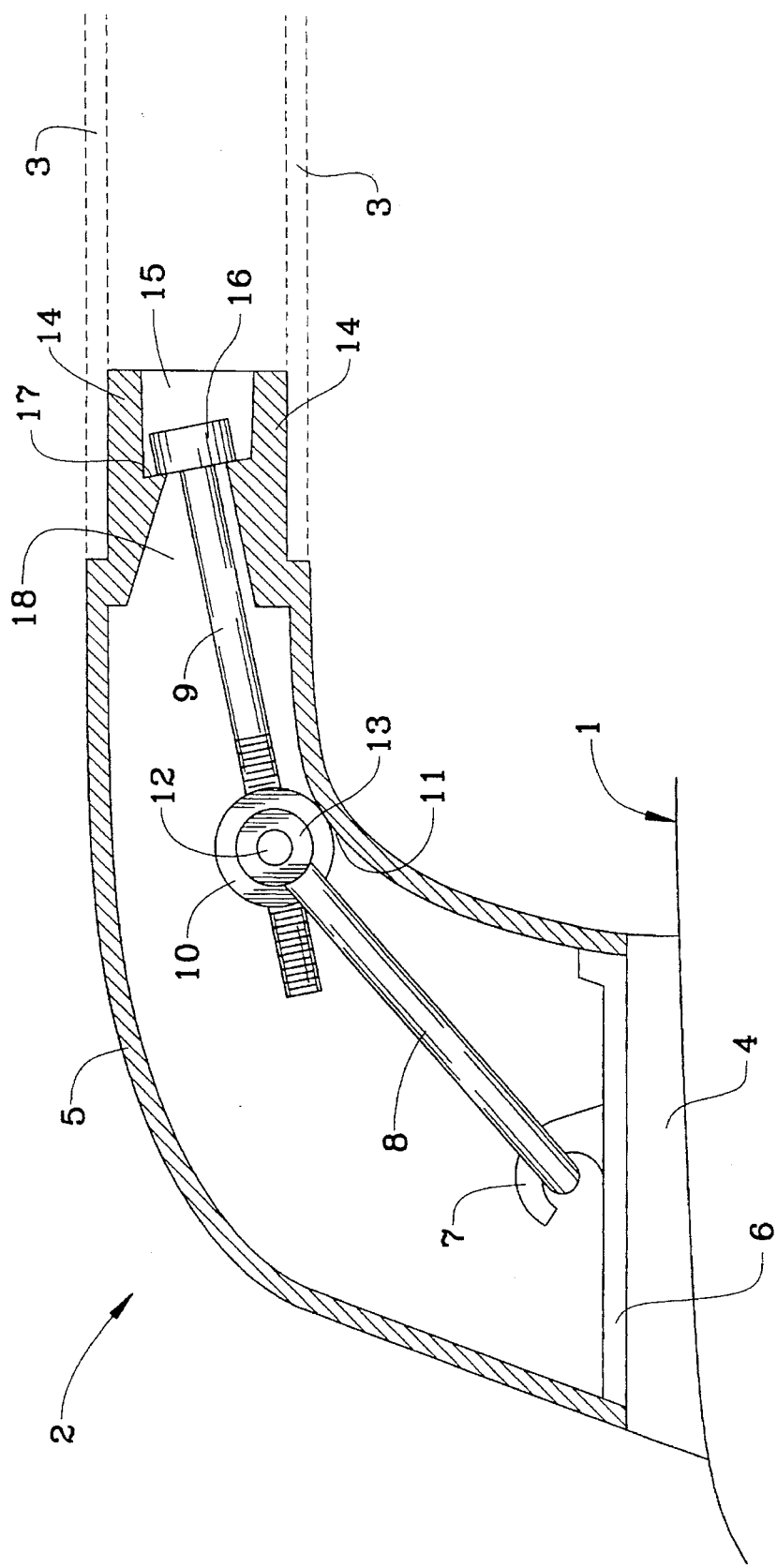

DEVICE FOR FASTENING A LOAD CARRIER

TECHNICAL FIELD

The present invention relates to a device for fastening a load carrier such as a so-called roof railing or other accessory to a vehicle body and comprises a hollow housing portion which connects with one end to the body.

BACKGROUND ART

Load carriers of the roof railing type are previously known in numerous different variations and entail a load carrier which has two rods disposed in spaced apart relationship and approximately parallel with one another in the longitudinal direction of the vehicle, the rods being permanently secured in the vehicle roof via feet. Various accessories for transport of loads are then fixed to these longitudinal rods.

The feet are often fixed in the vehicle roof with the aid of screw connections and screw heads or nuts which are required for this purpose may be concealed behind masking hatches or the like on the upper side of the load carrier foot. One such design and construction of the load carrier foot entails that a specific and complete foot must be manufactured for each vehicle body type, since the foot in respect of both its abutment surface against the vehicle body and the position of the anchorage elements must be adapted to the vehicle body in question. Thus, it is not possible, on the basis of a small number of standard components, to manufacture load carriers which may then readily be adapted in response to different vehicle body types and different anchorage techniques.

PROBLEM STRUCTURE

The present invention has for its object to design the device intimated by way of introduction in such a manner that it is aesthetically and aerodynamically appealing, without visible anchorage members, loose masking covers or the like. The invention further has for its object to design the device in such a manner that the finished load carrier may readily be adapted to different vehicle body types. Furthermore, the present invention has for its object to realize a device which permits extremely reliable and dependable fixing of a load carrier or other accessory.

SOLUTION

The objects forming the basis of the present invention will be attained if the device disclosed by way of introduction is characterized in that there is disposed interiorly in the housing a catch member in force-transmitting communication with the vehicle body; that there is provided, in the region of the catch member, an engagement member in force-transmitting connection with the vehicle body, the engagement member being, by engagement with the end of the housing portion facing the vehicle body, operative to prevent relative displacement between this end and the body in directions along the surface of the body; and that there is provided, interiorly in the housing portion, a coupling device which, in engagement with the catch member and under the action of a clamping member cooperating with the housing portion, is operative to draw the housing portion towards the vehicle body and into engagement with the engagement member.

In one advantageous embodiment, it also suitably applies according to the invention that the catch member and the engagement member are disposed on an adapter which is secured on the vehicle body type.

Major advantages are afforded as a result of these features, in that the only fitting which needs to be replaced in dependence upon the design of the vehicle body is the adapter or an interlay between the end of the housing portion facing the vehicle body and the vehicle body proper.

BRIEF DESCRIPTION OF THE ACCOMPANYING DRAWING

The present invention will now be described in greater detail hereinbelow, with particular reference to the accompanying Drawing which shows a vertical section through a foot of a load carrier of the roof railing type.

DESCRIPTION OF PREFERRED EMBODIMENT

On the accompanying Drawing figure, reference numeral 1 relates to a body part of a vehicle, preferably a roof. Reference numeral 2 generally relates to a foot or anchorage device for a load carrier or other vehicle accessory such as a spoiler, an antenna, a spotlight or the like. Reference numeral 3 relates to a load carrier rod which is included in the load carrier designed as a railing and which is carried by additional feet of similar design to or other design than the foot 2.

In its most generic form, the present invention implies that the vehicle roof or an adapter placed on the roof has been provided with an anchorage, preferably designed as a catch to which is connectible a coupling device disposed interiorly in the hollow foot, the coupling device being in communication with a clamping device which is disposed, in relation to the foot, to draw in the coupling device therein so that the end of the foot facing towards the vehicle body is drawn down towards the body.

In the embodiment according to the Drawing, there is provided an adapter 4 on the vehicle roof 1, the adapter being secured in a manner not shown in detail on the vehicle roof, for example by means of a screw connection or in that the end of the adapter 4 facing the roof 1 has specifically designed anchorages for cooperation with corresponding anchorages on the vehicle roof.

The adaptor 4 is exteriorly shaped in such a manner that, in terms of appearance and aerodynamics, it constitutes a continuation of or connection to a hollow housing portion 5 which constitutes the foot proper to the load carrier. The end of the housing portion 5 facing towards the vehicle roof cooperates with an engagement member 6 disposed on the adapter 4 and engaging with the end of the housing portion 5 facing the vehicle roof 1 in order thereby to prevent displacement of the housing portion along the vehicle roof or in directions approximately parallel therewith. In the illustrated embodiment, the engagement member consists of a raised portion or upwardly projecting strip which interiorly connects to the opening of the housing portion 5.

The adapter 4 is further provided with an anchorage device 7 which is designed as a catch member for interconnection with a coupling device 8 disposed interiorly in the housing portion 5.

The catch member 7 may also be placed and secured directly on the vehicle roof 1. The only essential feature is that the catch member 7 acts as an abutment when the coupling device 8 is drawn upwards and inwards in the housing portion. Further, the coupling device 8 must readily be capable of being engaged in and disengaged out of the catch member when the coupling device is unloaded.

The end of the coupling device 8 facing away from the catch member 7 is in communication with a clamping device 5 which comprises a screw 9 and a nut 10. In such instance, the clamping device is designed in such a manner that, on activation, it draws in the coupling device 8 upwards or inwards into the hollow housing portion 5. In the illustrated embodiment, the clamping device has a clamping direction which approximately corresponds to or makes an acute angle (0°–30°) with the longitudinal direction of the load carrier rod 3. Such a clamping direction entails, if it is applied direct to the catch member 7, that the housing portion 5 would be actuated with great force in a direction which is approximately parallel with the vehicle roof 1, but only with an insignificant or no force at all at right angles to the vehicle roof. Such a clamping direction does not favour securement of the housing portion, but the clamping direction should instead make an angle with the vehicle roof which, as far as is possible, approximates 90°. In order to achieve this, the arrangement is such that the clamping direction of the clamping device makes an angle with the clamping direction of the coupling device 8 in that the end of the coupling device 8 facing away from the catch member 7 or the end of the screw 9 facing towards the catch member 7 is provided with a support device which supports against an interior support surface 11 in the hollow housing portion.

In the embodiment shown on the Drawing, the support surface 11 consists of an arched or ramp-shaped section of the inner defining surface of the housing portion 5 facing towards the vehicle roof 1. Correspondingly, the support member consists of that nut 10 which is disposed on the screw 9 and which also serves for fixing the coupling device 8 in that the nut is provided with projecting pins 12 which extend pivotally through anchorage rings 13 in which the upper ends of the coupling device 8 are secured. In the illustrated embodiment, the nut 10 has two pins 12 projecting in opposing directions and, consequently, there are disposed about these pins, two anchorage rings in which corresponding shanks on the coupling device 8 are fixed. In the illustrated embodiment, the coupling device 8 consists of a steel wire or cable which is fixedly cast in the anchorage rings 13 and which extends about the catch 7 in the form of a loop.

In its upper end facing away from the vehicle roof, the housing portion 5 has a projecting portion 14 which serves for securing the load carrier rod 3 which, in a practical design, may be in the form of a U- or C-shaped profile body which is open in towards the longitudinal centre line of the vehicle roof. From the end of the projecting portion 14, there extends inwardly a recess 15 in which the head 16 of the screw 9 is located and lies against an abutment surface 17. The screw 9 extends further through a conically flared recess 18 which, at its broader end, is united with the interior space in the housing portion 5. The conicity of the recess 18 is such that the screw 9 may be obliquely inclined sufficiently to guarantee that the nut 10 and/or the coupling device come into abutment against the support surface 11.

In order to permit manufacture of the hollow housing portion 5 by a more or less simple casting process, it is essential that an imaginary curved plane in the hollow inner space of the housing portion 5 can be given the form of an approximately circular arc and that the distances at right angles from this plane to the forward/upper and rear/lower defining surfaces of the housing portion are approximately of equal size, and that they gradually diminish from the opening of the housing portion in to the bottom of the recess 18. By such a design of the interior space of the housing portion, that mould core which is employed in the casting tool for realising this space can be drawn out from the housing portion by a twisting movement whose centre coincides with the centre of the above-mentioned arched plane.

DESCRIPTION OF ALTERNATIVE EMBODIMENTS

It has been described in the foregoing how the load carrier foot is secured on an adapter 4 which, in its turn, is secured on the vehicle roof. However, according to the present invention it is also possible to secure the catch member 7 and engagement member 6 directly in the vehicle roof so as, between the end of the housing portion 5 facing towards the vehicle roof, only to employ a sealing and possibly configurationally adapted interlay.

As one alternative to the coupling device 8 which is made of steel wire and is thereby flexible, it is also possible, with the geometry illustrated on the accompanying Drawing figure, to design the coupling device as a rigid wire stirrup, a sheet metal stirrup or the like.

In the alternative with the coupling device 8 of flexible material such as the above-described steel wire, it is also possible, as an alternative to a complement to supporting the nut 10 against the support surface 11, to cause the coupling device 8 to abut against an arched support surface interiorly in the housing device. If this arched support surface is provided with an upper connecting portion which is aligned with the longitudinal direction of the screw 9, the screw and its nut 10 need not be supported against any support surface, since in such an event no transverse force can occur against the screw.

As an alternative to the engagement member 6 engaging interiorly with the opening portion of the housing portion 5, use may also be made of an engagement member which engages with the housing portion on its outside.

As an alternative to the placing of the screw 9 substantially in the longitudinal direction of the load carrier rod 3, the screw 9 may also be placed more transversely directed to the load carrier rod 3. For example, this may be realised in that the head 16 of the screw 9 is accommodated in a block which is disposed in the forward/upper surface of the housing portion 5 and which is recessed inside this surface and possibly covered with a cap. In such an embodiment, the drawing direction of the screw 9 and the coupling device 8 may lie wholly in alignment with one another.

Further modifications are possible without departing from the spirit and scope of the appended Claims.

What is claimed is:

1. A device for fastening a load carrier to a vehicle body, the device comprising:

an adapter for attachment to a vehicle body, the adapter including an engagement member projecting outwardly of a contour of the vehicle body and including a hook-shaped catch;

a housing portion, the housing portion having a first end, the first end being removably engageable with the engagement member to prevent relative displacement between the first end of the housing portion and the vehicle body in directions along a surface of the vehicle body, the housing having an interior space;

a coupling device disposed in the interior space of the housing, the coupling device being removably engageable with the catch; and a clamping device at least partially disposed in the interior space of the housing, the clamping device being connected to the coupling device and cooperating with the housing to move the coupling device inside the interior space of the housing to effect engagement between the coupling device and the catch and to move the first end of the housing into engagement with the engagement member, the clamping device being oriented such that the clamping device effects a significant force substantially parallel to a roof of the vehicle.

2. The fastening device as set forth in claim 1, wherein the engagement member includes an exterior surface, the exterior surface of the engagement member abutting against an interior surface of the housing portion at the first end of the housing portion.

3. The fastening device as set forth in claim 1, wherein the clamping device includes a screw, the screw being substantially parallel to the contour of the vehicle body when the first end of the housing portion and the engagement member are engaged.

4. The fastening device as set forth in claim 1, wherein the clamping device includes a screw, the screw being at an acute angle relative to the contour of the vehicle body when the first end of the housing portion and the engagement member are engaged.

5. The fastening device as set forth in claim 1, further comprising a support portion mounted on an end of the clamping device, the coupling device being connected to the clamping device by the support portion.

6. The fastening device as set forth in claim 1, wherein the coupling device includes a flexible wire.

7. A device for fastening a load carrier to a vehicle body, the device comprising:

an adapter for attachment to a vehicle body, the adapter including an engagement member projecting outwardly of a contour of the vehicle body and including a hook-shaped catch;

a housing portion, the housing portion having a first end, the first end being removably engageable with the engagement member to prevent relative displacement between the first end of the housing portion and the vehicle body in directions along a surface of the vehicle body, the housing having an interior space;

a coupling device disposed in the interior space of the housing, the coupling device being removably engageable with the catch; and a clamping device including a screw and a support portion, the support portion having an interior thread engaging with a threaded portion of the screw, the support portion and at least a portion of the screw being disposed in the interior space of the housing, the clamping device being connected to the coupling device by the support portion, wherein turning the screw in a first direction relative to the support portion causes the coupling device inside of the interior space of the housing to effect engagement between the coupling device and the catch and moves the first end of the housing into engagement with the engagement member.

8. The fastening device as set forth in claim 7, wherein, when the screw is turned in the first direction relative to the support portion, the support portion contacts an interior support surface of the housing.

9. The fastening device as set forth in claim 7, wherein the screw and the coupling device are non-parallel.

10. The fastening device as set forth in claim 7, wherein the coupling device includes a flexible wire secured to the support portion.

11. The fastening device as set forth in claim 10, wherein a pin extends from the support portion perpendicular to a longitudinal axis of the screw and the flexible wire is secured to the support portion by an anchorage ring attached to an end of the flexible wire, the pin extending through a central opening of the anchorage ting.

12. A device for fastening a load carrier to a vehicle body, the device comprising:

a hook-shaped catch mounted on a vehicle body;

a housing portion, the housing portion having a first end and an interior space, the catch being received in the first end of the housing;

a coupling device disposed in the interior space of the housing, the coupling device being removably engageable with the catch; and a clamping device at least partially disposed in the interior space of the housing, the clamping device being connected to the coupling device and cooperating with the housing to move the coupling device inside of the interior space of the housing to effect engagement between the coupling device and the catch, the clamping device being oriented such that the clamping device effects a significant force substantially parallel to a roof of a vehicle.

13. The fastening device as set forth in claim 12, further comprising an adapter, the catch being mounted to the vehicle body by the adapter, the adapter including an engagement member, the engagement member including an exterior surface, the exterior surface of the engagement member abutting against an interior surface of the housing portion at the first end of the housing portion to prevent relative displacement between the first end of the housing portion and the vehicle body in directions along a surface of the vehicle body.

14. The fastening device as set forth in claim 12, wherein the clamping device includes a screw and a support member having an internal thread engaging with a threaded end of the screw, the housing is formed with an opening extending from outside of the housing to the interior space, the threaded end of the screw extending through the opening and being attached to the support member inside the interior space, a headed end of the screw being larger than the opening and abutting against an abutment surface of the housing, the coupling device being connected to the clamping device by the support member, turning the screw in a first direction relative to the support portion moving the coupling device inside of the interior space of the housing to effect engagement between the coupling device and the catch and to move the first end of the housing into engagement with the engagement member.

15. The fastening device as set forth in claim 14, wherein the housing is formed with a recess, the headed end of the screw being received in the recess.

16. The fastening device as set forth in claim 14, wherein the housing includes a projecting portion at a second end of the housing, a recess being formed in the projecting portion.

17. The fastening device as set forth in claim 16, further comprising a load carrier rod having an internal opening, the projecting portion being received in the internal opening of the load carrier rod.

* * * * *